United States Patent
Maheshwari et al.

(10) Patent No.: US 8,228,834 B2
(45) Date of Patent: Jul. 24, 2012

(54) RELAY CONFIGURED TO PERFORM RANGING OPERATION WITH A USER EQUIPMENT

(75) Inventors: Shashikant Maheshwari, Irving, TX (US); Yousuf Saifullah, Richardson, TX (US)

(73) Assignee: Nokia Corporation, Espoo (FI)

( * ) Notice: Subject to any disclaimer, the term of this patent is extended or adjusted under 35 U.S.C. 154(b) by 1316 days.

(21) Appl. No.: 11/822,139

(22) Filed: Jul. 2, 2007

(65) Prior Publication Data
US 2008/0031182 A1   Feb. 7, 2008

Related U.S. Application Data

(60) Provisional application No. 60/817,398, filed on Jun. 30, 2006.

(51) Int. Cl.
| | |
|---|---|
| H04B 7/14 | (2006.01) |
| H04B 7/216 | (2006.01) |
| H04B 7/15 | (2006.01) |
| H04B 7/185 | (2006.01) |
| H04J 1/10 | (2006.01) |
| H04J 3/08 | (2006.01) |

(52) U.S. Cl. ....... 370/315; 370/320; 455/11.1; 455/13.1

(58) Field of Classification Search ............. 370/320, 370/226, 315; 455/13.1, 11.1
See application file for complete search history.

(56) References Cited

U.S. PATENT DOCUMENTS

| 5,533,027 | A | 7/1996 | Åkerberg et al. |
| 7,486,928 | B2 * | 2/2009 | Izumikawa et al. .......... 455/11.1 |
| 7,664,480 | B2 * | 2/2010 | Kim et al. .................. 455/343.2 |
| 2002/0187746 | A1 * | 12/2002 | Cheng et al. ................. 455/11.1 |
| 2005/0042999 | A1 | 2/2005 | Rappaport |
| 2006/0098614 | A1 * | 5/2006 | Moon et al. ................... 370/338 |
| 2007/0201392 | A1 * | 8/2007 | Ramachandran ............ 370/315 |

FOREIGN PATENT DOCUMENTS

| JP | 2002198892 A | 7/2002 |
| JP | 2007110725 A | 4/2007 |
| JP | 2007158662 A | 6/2007 |
| WO | WO 2006/023771 A2 | 3/2006 |
| WO | WO 2007/100224 A2 | 9/2007 |

OTHER PUBLICATIONS

International Search Report, International Application No. PCT/IB2007001884, filed Jun. 25, 2007.

* cited by examiner

*Primary Examiner* — Marisol Figueroa
(74) *Attorney, Agent, or Firm* — Harrington & Smith

(57) ABSTRACT

A relay for use in a communications network, the relay being arranged receive data from and transmit data to at least one user equipment, wherein the relay includes a processor arranged to process received configuration data from the user equipment and to transmit data to the user equipment in dependence of the processed ranging data.

15 Claims, 5 Drawing Sheets

RELAY CONFIGURED TO PERFORM RANGING OPERATION WITH A USER EQUIPMENT

CROSS REFERENCE TO RELATED APPLICATIONS

This application claims priority of U.S. Provisional Patent Application Ser. No. 60/817,398, filed on Jun. 30, 2006. The contents of the application is hereby incorporated by reference.

BACKGROUND OF THE INVENTION

Field of the Invention

The present invention relates to a relay, a method of forwarding signals and a communication system. The relay is in particular but not exclusively part of a multilevel relay chain.

Networks using relay units for forwarding of information are well known. In wireless networks such as cellular wireless networks, it is known to provide relay units for signals transmitted from base transceiver stations. In such arrangements the radio signal transmitted by a base transceiver station is received by a relay unit and is retransmitted by the relay unit, typically to a mobile terminal or other user equipment.

Currently, there is a challenge to ensure that there is sufficient coverage in a wireless network in order to provide high data rate services. With the current systems, usually only user equipment close to base stations have a potential for high data rates as the possible bandwidth which is limited by data error rates from the user equipment to the base station is strongly correlated to the inverse of the distance. Therefore in order to achieve high data rate coverage, a greater number of base stations are required. However, increasing the number of base stations is costly.

Relay units or relays have been proposed in order to distribute the data rate more evenly in the cell. However, there are problems associated with integrating relays or relay units into a wireless communication system.

One known problem is with regards to ranging or initially connecting the user equipment to the network where there are relay station(s) operating between the base station and the user equipment. In such environments the ranging procedures performed between the user equipment and base station cannot be directly applied. For example, the ranging process defined in IEEE 802.16, also known as WiMax, requires a user equipment initial ranging message to be sent via the relay station to the base station. However, the relay station cannot simply relay the ranging messages related to the initial measurements and settings with regards the connection between the base station and relay station as the connection between the user equipment and relay station is different to the connection between the base station and relay station. The base station furthermore as implemented in IEEE 802.16 is not aware of the radio connection between the user equipment and relay station.

Furthermore, if the initial ranging message was forwarded to the base station via the radio relay station multiple levels of contention resolution would be required at each stage which would increase the overall time required for the ranging procedure.

SUMMARY OF THE INVENTION

It is an aim of at least one embodiment of the present invention to address or at least mitigate this difficulty. However, the embodiments of the invention recited in the summary of the invention are intended to be merely exemplary and are not intended to be limiting upon the scope of the invention.

According to an embodiment of the present invention, there is provided a relay for use in a communications network, the relay being arranged to receive data from and transmit data to at least one user equipment, wherein the relay includes a processor arranged to process received configuration data from the user equipment and to transmit data to the user equipment in dependence of the processed configuration data.

The configuration data may be ranging data, and further, the configuration data may be CDMA ranging data.

The configuration data may generally be data used to configure the wireless communications link from the relay to the at least one user equipment.

The processor may generally be arranged to transmit a configuration response success message in dependence of the processed configuration data.

The relay may generally be arranged to transmit further data to and receive further data from a base station, wherein the processor may further be arranged to transmit further configuration data to the base station.

In at least one embodiment of the invention, the configuration data may include further ranging data, and the further configuration data may be CDMA ranging data, and the further configuration data may be data used to configure the wireless communications link from the relay to the base station. The further configuration data may include a bandwidth request.

The processor may be arranged to process received configuration data from the user equipment and transmit further configuration data to the base station in parallel.

According to another embodiment of the present invention there is provided a method for operating a relay for use in a communications network, the relay being arranged to receive data from and transmit data to at least one user equipment, wherein the method includes processing at the relay configuration data received from the user equipment; and transmitting data from the relay to the to the user equipment in dependence of the processed configuration data.

The configuration data may be ranging data, and further, the configuration data may be CDMA ranging data.

The configuration data may generally be data used to configure the wireless communications link from the relay to the at least one user equipment.

The method for operating a relay may further include transmitting from the relay to the user equipment a configuration response success message in dependence of the processed configuration data.

The relay may be further arranged to transmit further data to and receive further data from a base station, and the method may further include transmitting from the relay to the base station further configuration data.

The further configuration data may include further ranging data, and the further configuration data may be CDMA ranging data.

The further configuration data may be data used to configure the wireless communications link from the relay to the base station, and the further configuration data may include a bandwidth request.

Processing at the relay configuration data received from the user equipment and transmitting from the relay further configuration data to the base station may be carried out substantially in parallel.

In another embodiment of the present invention, there is provided a computer program arranged to operate a computer to perform a method for operating a relay for use in a communications network, the relay being arranged receive data from and transmit data to at least one user equipment, wherein the method includes processing at the relay configuration data received from the user equipment; and transmitting data from the relay to the to the user equipment in dependence of the processed configuration data.

BRIEF DESCRIPTION OF DRAWINGS

For a better understanding of the present invention and as to how the same may be carried out, reference will now be made, by way of example only, to the accompanying figures in which.

DETAILED DESCRIPTION OF PREFERRED EMBODIMENTS OF THE INVENTION

Figure 1:
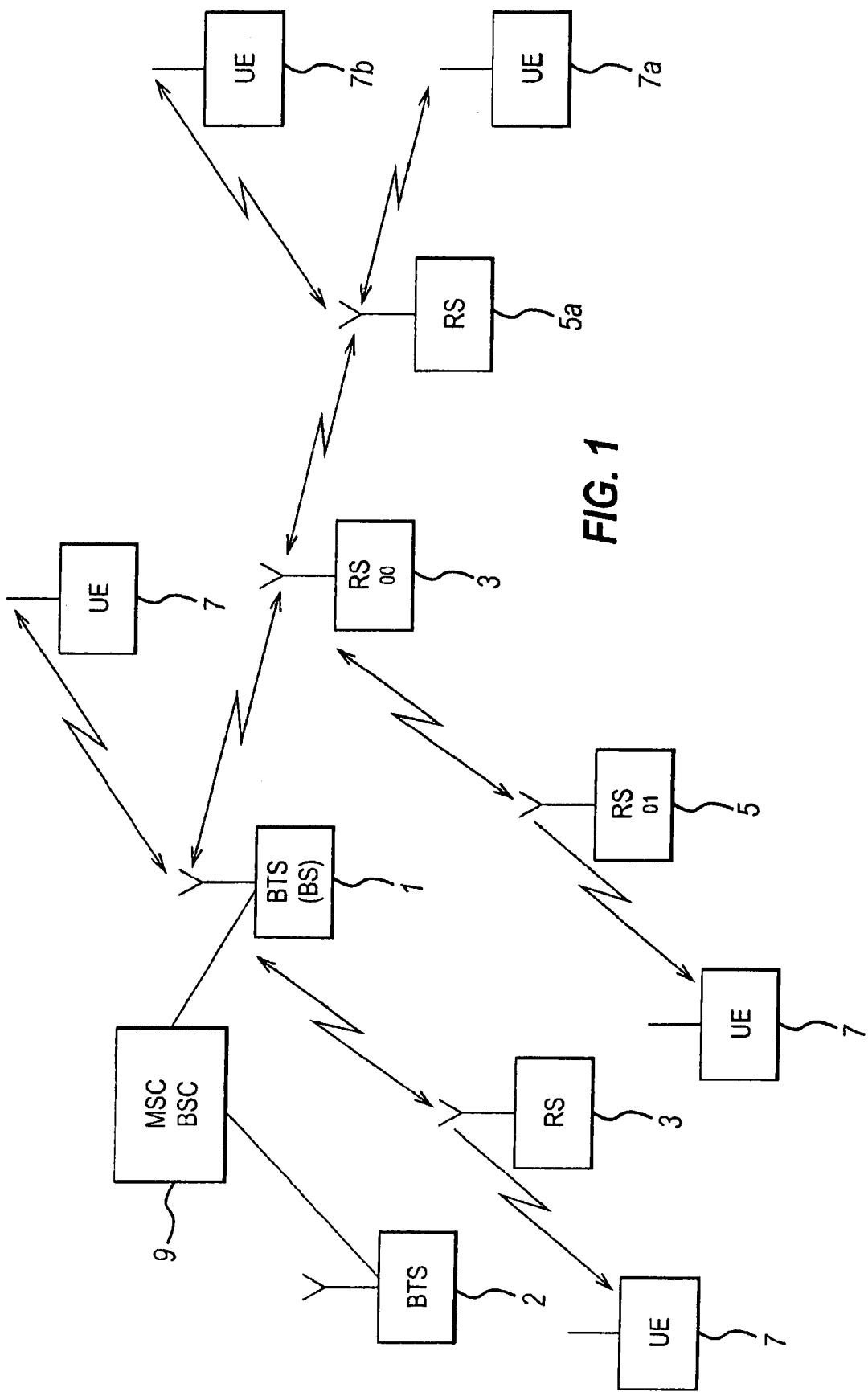
FIG. 1 shows a schematic view of an exemplary communications network within which embodiments of the present invention may be implemented.

FIG. 1 shows an exemplary communications network of the invention. The communications network includes base transceiver stations (BS) 1,2 also known as base stations. The base stations (BS) 1,2 are arranged to be capable of communicating with a base station controller (BSC) 9. In other embodiments the base stations are arranged to be capable of communicating with any known public land mobile network (PLMN) infrastructure. The base stations 1, 2 are also arranged to be capable of communicating with user equipment 7. The base stations are also arranged to be capable of communicating with relay stations (RS) 3,5.

The relay stations (RS) 3,5 are arranged to be capable of communicating with the base transceiver stations (BS) 1, 2. The relay stations are also capable of connecting to a mobile station (MS) 7. The relay stations (RS) 3, 5 are also capable of communicating to other relay stations (RS) 5, 3.

The linking of the relay stations is also shown in FIG. 1. FIG. 1 shows a first group of relay stations 3 which are connected directly to the base station 1 and a second group of relay stations 5 which are connected to the base station 1 via the first group of relay stations 3. Although not shown in FIG. 1 this chaining can be extended so that further groups of relay stations are connected to the base station via the previous groups of relay stations. To further assist the understanding of the present invention one of the first group of relay stations 3 has been given the reference value RS00 and one of the second group of relay stations 5 has been given the reference value RS01. These reference values are exemplary only and could be applied to any two chained relay stations—i.e. the below described examples can be applied to any two connected relay stations of adjacent groups.

The user equipment (UE), mobile station (MS) or subscriber station (SS) can be any suitable form of user equipment such as a mobile station, mobile telephone, personal organiser, PDA (personal digital assistant), computer, portable computer, notebook or the like.

In practice many more user equipment are provided. It should also be appreciated that in some embodiments of the invention a relay unit may be able to communicate with more than one base station. To aid the understanding of the invention the examples discussed will concern the part of the network comprising the base station 1, relay station 5*a*, and user equipment 7*a* and 7*b*. It would be understood by the person skilled in the art that other arrangements of entities would also be possible.

Figure 2:
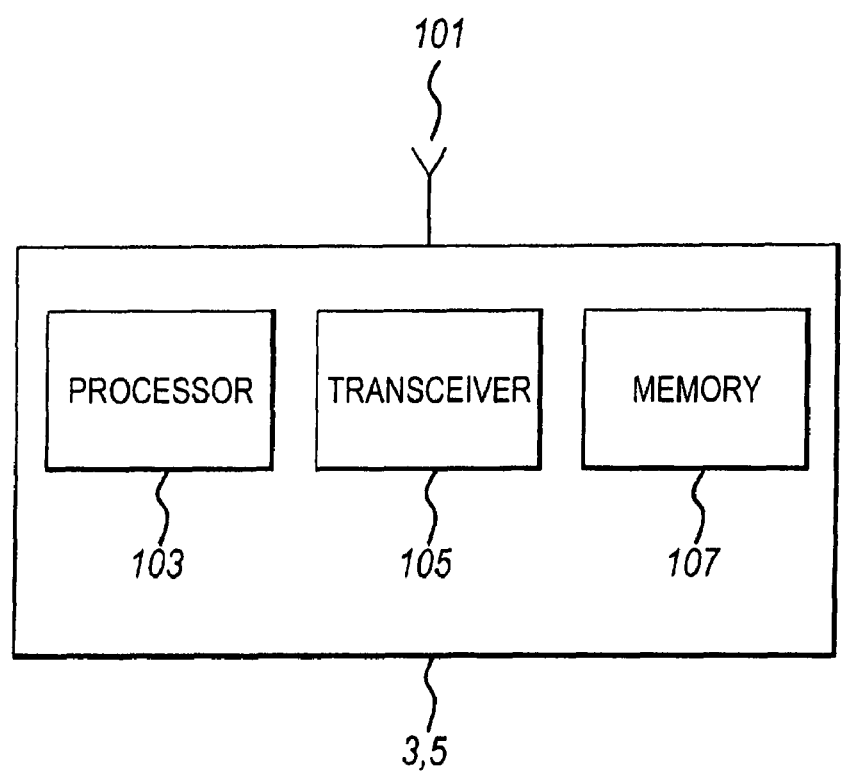
FIG. 2 shows an exemplary relay unit as shown in FIG. 1 embodying an exemplary embodiment the present invention.

The relay station (RS) 5*a* embodying the present invention is shown in more detail in FIG. 2. The relay station RS 5*a* includes an antenna 101 arranged to be capable of transmitting and receiving radio frequency signals from base station 1, user equipment 7*a*, 7*b* and other relay stations 3, 5. The antenna 101 may include an antenna array capable of beam forming and transmitting or receiving signals to or from a specific spatial direction.

The relay station RS may further include a transceiver 105 connected to the antenna 101 and arranged to be capable of receiving radio frequency signals from the antenna and outputting base band signals and receiving base band signals and transmitting radio frequency signals to the antenna 101 for transmission.

The relay station RS 5*a* further includes a processor 103 arranged to control the transceiver and for operating the relay station memory 107.

The relay station RS 5*a* further includes a memory 107, which is arranged to store instructions for the operation of the relay station 5*a*. Furthermore the memory can be arranged to buffer received data prior to being re-transmitted to its destination. In some embodiments of the invention a separate memory may be used for storing different types of data, i.e. the received data may be stored on a magnetic storage media and the instructions stored on semiconductor memory devices.

It should be appreciated that the example of the relay station shown in FIG. 2 illustrates the functionality. It should be appreciated that aspects of the transceiver circuitry 105 may be incorporated in the processor 103 and vice versa.

Figure 3:
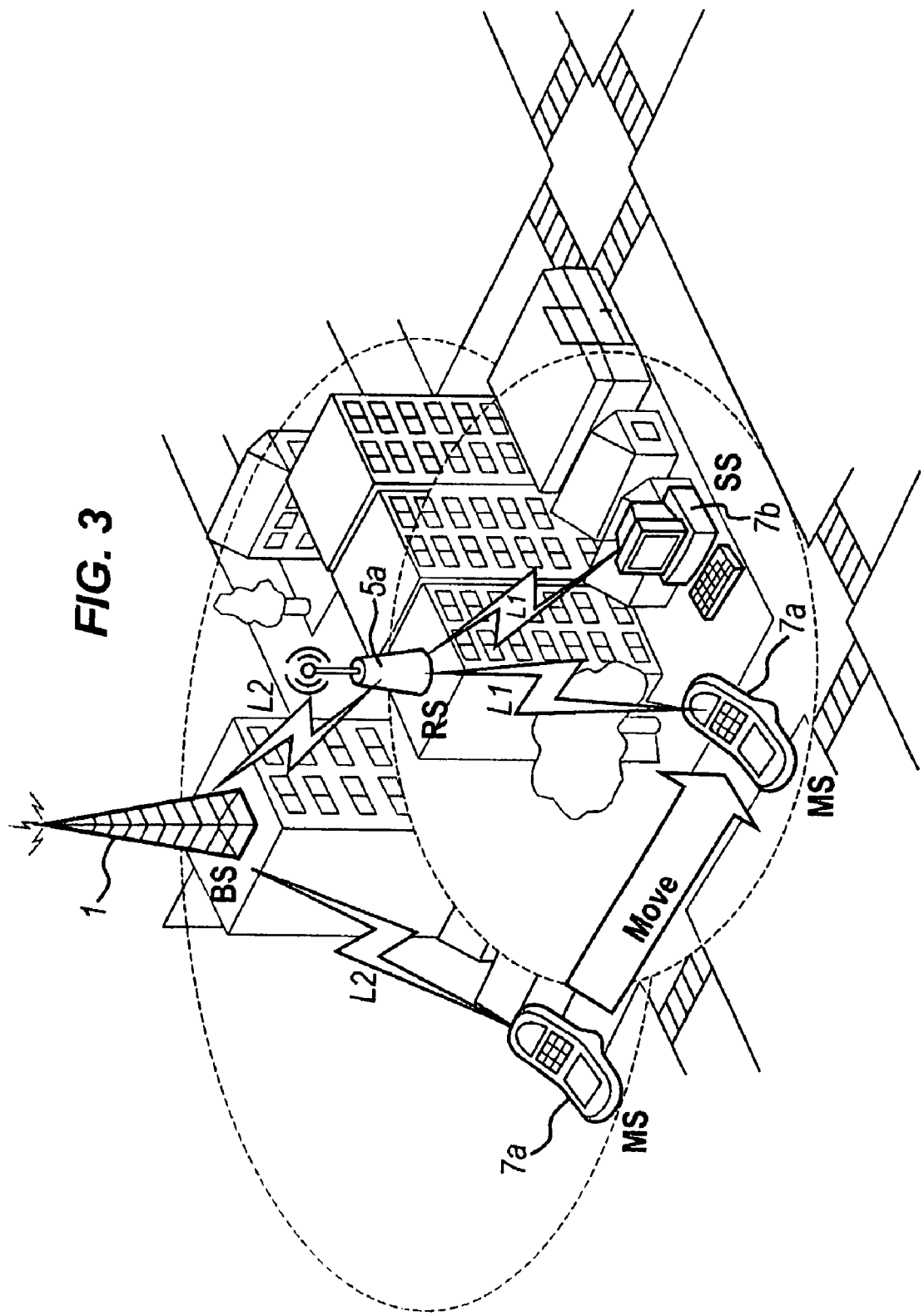
FIG. 3 shows a schematic view of part of the exemplary communications network shown in FIG. 1.

FIG. 3 shows a small part of the radio network as shown in FIG. 1. FIG. 3 shows the base station 1 (BS) connected to the relay station 5*a* via the level 2 communications link. Furthermore the relay station 5*a* is connected to the user equipment (UE) or subscriber station (SS) 7*b* which is shown as a personal computer via a L1 link. The base station is shown connected to the mobile station (MS) or user equipment (UE) 7*a* via a L2 link at a first time instant and following movement of the mobile station 7*a*, the mobile station is shown located within the region served by the relay station 5*a*. The relay station is shown communicating with the mobile station 7*a* via a L1 link. The mobile station 7*a* is shown in the example as a mobile telephone, however any suitable user equipment can alternatively be used.

When the mobile station 7*a* attempts to get initial access to the network via the base station at the first time instant i.e. when directly connected to the BS, the IEEE 802.16 (or WiMax) standard indicates that a ranging procedure is performed between the user equipment and base station. During this ranging procedure, the user equipment carries out a contention based code division multiple access (CDMA) ranging which allocates to the user equipment the code, frequencies and other parameters needed to communicate with the base station. Upon successfully receiving an initial CDMA code sequences and parameters from the MS, the base station provides power, timing, and frequency adjustments to the MS. The MS then uses these adjustment values and performs a further contention based CDMA ranging process using new values. This procedure repeats until the reception at the base station is within the required thresholds. When the required thresholds have been met, the base station provides the unicast uplink allocation i.e. when and what bandwidth is to be transmitted from the MS using a message such as the CDMA_ALLOCATION_IE. On receipt of this uplink allocation message the MS sends a complete ranging message to the base station in the form of a range request message.

However, when the mobile station moves within the reception range of the relay station and out of the range of the base station as shown by the second instant in FIG. 3, the ranging procedure for the user equipment attached to the relay station is different.

Assuming the relay station transmits its own preamble and mapping variables (MAPs), the user equipment carries out its own ranging with the relay station, and the user equipment contact is anchored at the base station (in other words, all of the allocations of the parameters are done by the base station such as the basic, primary connection identifier (CID). The CID identifies a service in 802.16 MAC and/or one or more users (in a group). Every MAC packet has a CID. Based on the CID, a 802.16 device can determine the recipient of the MAC packet. There are also several different types of CIDs, which identify a message category.

The CID in 802.16 is 16 bits long.

The different CID groups are broadcast, multicast (used to address multicast groups) and unicast (mobile station specific messages like bandwidth allocation, polling, invited ranging) CIDs.

Unicast CIDs can be further divided into management CIDs (signalling messages between MS and BS) and transport CIDs (to carry user data).

The primary CID is used for delay tolerant messages like authentication and registration messages, and the basic CID is used for delay intolerant messages, e.g. PHY parameters or polling.

The ranging has a UL-MAP, a message transmitted by the BS which shows dedicated bandwidth allocated for the user equipment in the uplink. Using the allocated bandwidth in the UL-MAP the MS sends a ranging request. At this point the MS does not have an allocated CID. For this message the MS uses a well known connection id called Initial ranging CID, whose value is 0x0000. In response to that message the BS sends a ranging response, which assigns basic and primary CIDs to the MS. After this MS can use those CIDs in MAC messages.

In FIG. 3, L1 as described above defines the radio communication links between the MS and the relay station and L2 defines the radio communication link(s) between the relay station and the base station or the MS and base station. The radio conditions on the L1 link are typically different as to the conditions on the L2 link. Therefore, power, timing and frequency adjustments already performed with regards to the L2 link, which are determined during the initial setting up or ranging of the relay station cannot simply be forwarded and used by the MS when the MS 7a wants to start ranging with the relay station. The relay station therefore also cannot just simply relay the already known ranging messages related to the L2 link and the relay stations initial ranging because the base station was not originally aware of the radio condition of the L1 link.

One solution is to require the relay station to forward all messages in a ranging procedure to the base station. However, this multiple level of contention produces large delays and signalling bandwidth wastage for each of the links.

Figure 4:
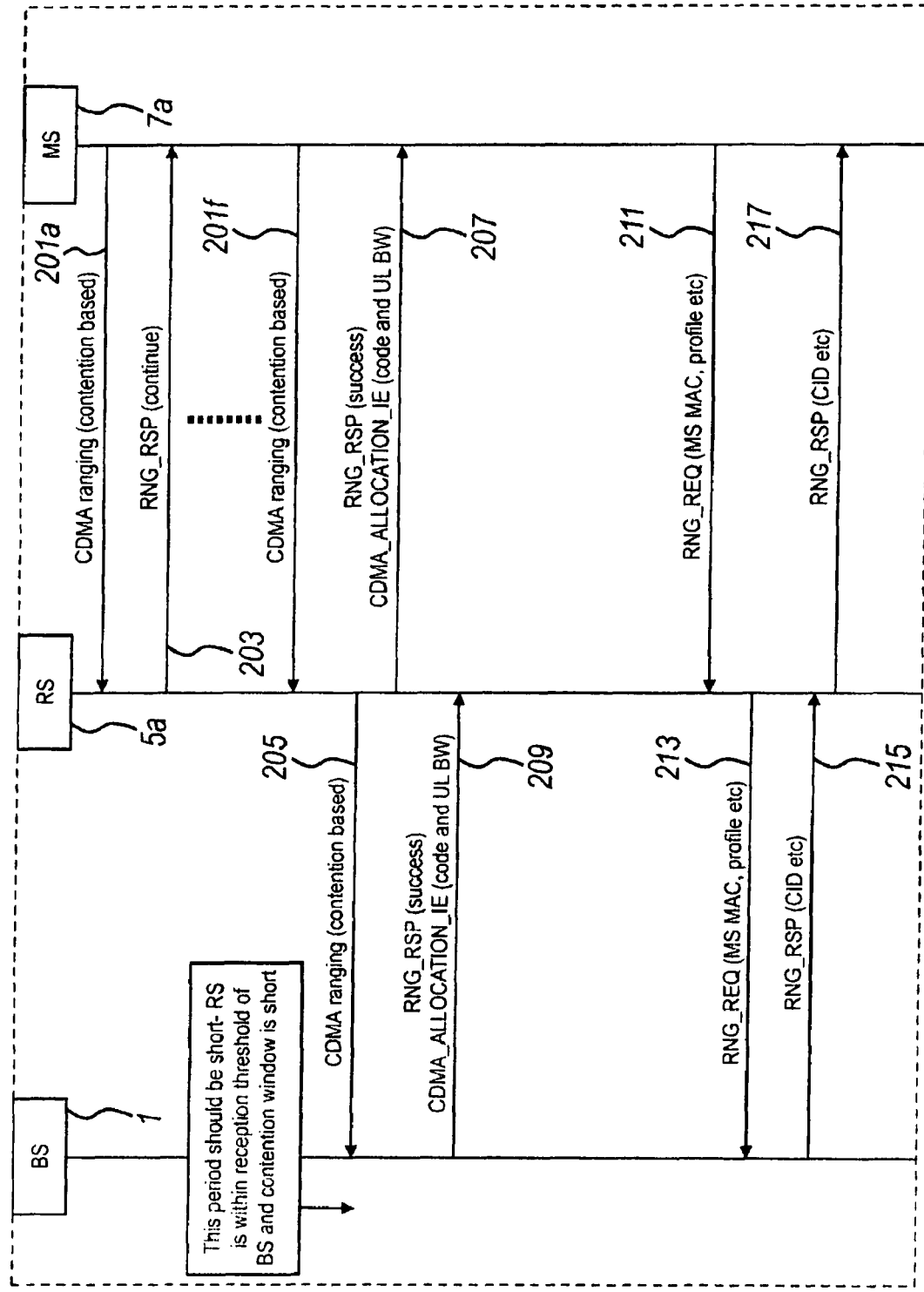
FIG. 4 shows a schematic view of an exemplary signal flow in a first embodiment of the invention as implemented in an exemplary relay as shown in FIG. 2.
Figure 5:
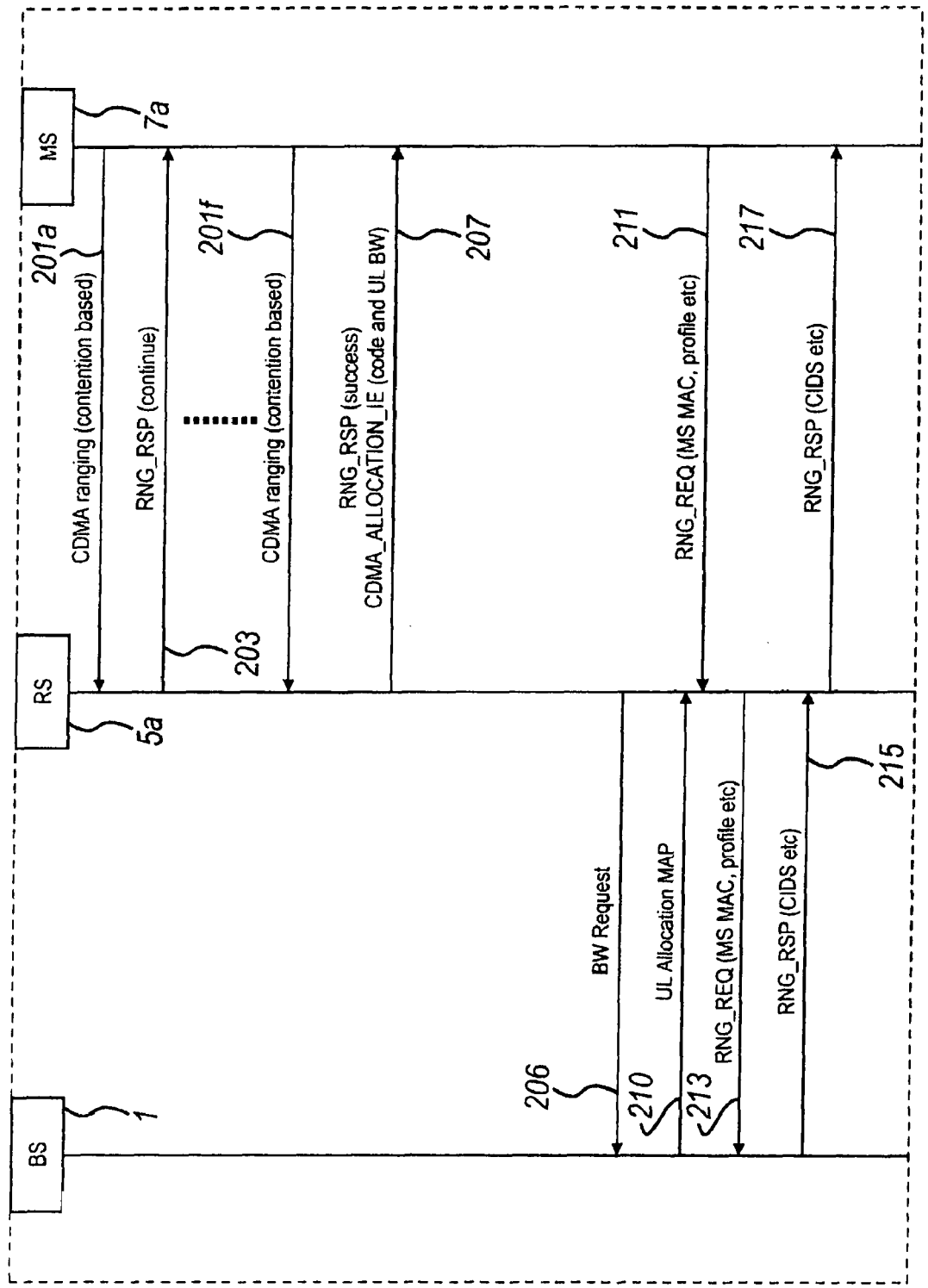
FIG. 5 shows a schematic view of an exemplary signal flow in a further embodiment of the invention as implemented in the exemplary relay as shown in FIG. 2.

FIGS. 4 and 5 show two exemplary methods which mitigate the problem. In both of these solutions as implemented in the relay station as embodiments of the invention do not forward the CDMA initial ranging request to the base station. The relay station however carries out a local ranging. The relay station attached to the MS performs the initial ranging i.e. the adjustment of the L1 link between the RS and MS and then forwards a complete ranging request message to the base station once the initial ranging is completed.

Furthermore, at the same time as the relay station performs the initial local ranging contention CDMA procedure the relay station in embodiments of the invention also transmits an uplink bandwidth request/ranging request towards the base station on the L2 link. The relay station in performing these processes in parallel or partially in parallel it is possible to significantly reduce the delay of the ranging procedure.

FIG. 4 shows an implementation of an exemplary embodiment of the invention. In step 201a, the first CDMA ranging request is sent from the mobile station to the relay station. The relay station in step 203 on receipt of the CDMA ranging message, transmits back to the mobile station a response message (RNG_RSP) which contains some adjustment values for the mobile station.

The mobile station uses these adjustments and resends the CDMA ranging message and receives further responses until the CDMA ranging process is complete for the L1 link.

The completion is shown in FIG. 4 by the step 201f when a final CDMA ranging message is sent from the mobile station to the radio relay station.

On receipt of this CDMA ranging message within allowable thresholds, the relay station transmits in step 205a first message to the base station with a CDMA ranging message, and in step 207 also transmits a message to the mobile station containing the successful ranging response containing variables and also the CDMA allocation message containing the codes and uplink bandwidth for the L1 link.

The base station on receipt of the CDMA ranging message transmits in step 209 a ranging response message with the success code and also the uplink bandwidth and code variables. The CDMA ranging request cycle from the relay station to the base station period should normally be short as the relay station is within the reception threshold of the base station already and therefore the contention window is short.

On receipt of the ranging request response message from the relay station, the mobile station in step 211, transmits the complete ranging request message containing the MAC address and profile information to the relay station on the L1 link.

In step 213 the relay station transmits the complete ranging request message containing the MAC address and profile information to the base station over the L2 link.

The base station in step 215 on receipt of the complete ranging request message from the relay station transmits back the ranging response message containing the CID which is then forwarded from the relay station to the mobile station in step 217.

Therefore by reducing the amount of transmission ranging information being sent between the base station and the mobile station via the relay station, the response time for doing a ranging is significantly reduced.

This time is further reduced in multiple hop environments, where multiple relay stations are located between the mobile station and base station.

Another exemplary embodiment of the present invention is shown in FIG. 5. Where steps or network elements are featured which are similar to those described in FIG. 4, the same reference numbers are used.

The steps 201a, 203 and 211f are generally the same as that described in FIG. 4. Therefore the mobile station transmits an initial CDMA ranging request to the relay station and the relay station and mobile station iteratively approach the CDMA linkage required for the L1 link until the mobile station transmits the CDMA ranging variables within the threshold in step 201f. At this point, the relay station transmits the success message to the mobile station in step 207 as has been described above with reference to the previous embodiment.

However, the relay station transmits to the base station a request for bandwidth, in step 206, as the CDMA ranging procedure previously carried out when the relay station connected first the base station is considered to be still valid and therefore the codes used and power values are still also valid for communication between the relay station and the base station. The base station in step 210 transmits back an uplink allocation map to the relay station. This allocates a specific uplink capacity for the communication between the mobile station and the base station for the mobile station.

In steps 211, 213, 215 and 217, the same procedures as described previously with regards to FIG. 4 are carried out to complete the ranging process.

Therefore this embodiment further improves on the efficiency of the previous embodiments as it only requires a uplink allocation to be passed to the relay station.

In some embodiments of the present invention, the CDMA ranging request carried out on the L2 link, step 205 and the bandwidth request carried out on the L2 link, step 206, as shown in FIGS. 4 and 5 respectively, are carried out at the same time as the iteration of the CDMA ranging process is carried out between the relay station and the mobile station.

The above described operations may require data processing in the various entities. The data processing may be provided by means of one or more data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a location server.

It is noted that whilst in the above embodiments are described in relation to user equipment such as mobile stations, embodiments of the present invention are applicable to any other suitable type of user equipment.

It is also noted that even though the exemplifying communication system shown and described in more detail in this disclosure uses the terminology of the WiMAX system, embodiments of the proposed solution can be used in any communication system wherein advantage may be obtained by means of the embodiments of the invention. The invention is not limited to environments such as cellular mobile or WLAN systems either. The invention could be for example implemented as part of the network of computers known as the "Internet", and/or as an "Intranet". Furthermore the user equipment 14 in some embodiments of the present invention can communicate with the network via a fixed connection, such as a digital subscriber line (DSL) (either asynchronous or synchronous) or public switched telephone network (PSTN) line via a suitable gateway.

It is also noted that while the above describes exemplifying embodiments of the invention, there are several variations and modifications which may be made to the disclosed solution without departing from the scope of the present invention as defined in the appended claims.

The invention claimed is:

1. An apparatus, comprising:
a processor; and
a memory including computer program code, where the memory and computer program code are configured to, with the processor, cause the apparatus at least to,
receive an initial ranging request from a user equipment;
generate an initial ranging response based at least partly on the initial ranging request;
transmit the initial ranging response to the user equipment;
receive, in response to the initial ranging response, a complete ranging request from the user equipment;
transmit the complete ranging request to a base station;
receive a ranging response from the base station associated with the complete ranging request; and
transmit the ranging response received from the base station to the user equipment.

2. The apparatus as claimed in claim 1, wherein the complete ranging request comprises the MAC address of the user equipment.

3. The apparatus as claimed in claim 1, wherein the initial ranging response comprises adjustment information of an L1 link between the apparatus and the user equipment.

4. The apparatus as claimed in claim 1, wherein the apparatus is embodied as a relay station.

5. The apparatus as claimed in claim 1, wherein the user equipment is a mobile station.

6. A method comprising:
receiving, by an apparatus, an initial ranging request from a user equipment;
generating, by the apparatus, an initial ranging response based at least partly on the initial ranging request;
transmitting, by the apparatus, the initial ranging response to the user equipment;
receiving, by the apparatus in response to the initial ranging response, a complete ranging request from the user equipment;
transmitting, by the apparatus, the complete ranging request to a base station;
receiving, by the apparatus, a ranging response from the base station associated with the complete ranging request; and
transmitting, by the apparatus, the ranging response received from the base station to the user equipment.

7. The method as claimed in claim 6, wherein the complete ranging request comprises the MAC address of the user equipment.

8. The method as claimed in claim 6, wherein the initial ranging response comprises adjustment information of an L1 link between a relay station and the user equipment.

9. The method as claimed in claim 6 wherein the apparatus is a relay station.

10. The method as claimed in claim 6, wherein the user equipment is a mobile station.

11. A non-transitory storage medium storing a program of instructions, execution of which by a processor configures an apparatus to perform the actions of:
receiving an initial ranging request from a user equipment;
generating an initial ranging response based at least partly on the initial ranging request;
transmitting the initial ranging response to the user equipment;
receiving, in response to the initial ranging response, a complete ranging request from the user equipment;
transmitting the complete ranging request to a base station;
receiving a ranging response from the base station associated with the complete ranging request; and transmitting the ranging response received from the base station to the user equipment.

12. The non-transitory storage medium as claimed in claim 11, wherein the complete ranging request comprises the MAC address of the user equipment.

13. The non-transitory storage medium as claimed in claim 11 embodied with the processor in a relay station, wherein the initial ranging response comprises adjustment information of an L1 link between the relay station and the user equipment.

14. The non-transitory storage medium as claimed in claim 11 embodied with the processor in a relay station, wherein receiving the initial ranging request comprises receiving the initial ranging request at the relay station.

15. The non-transitory storage medium as claimed in claim 11 wherein the user equipment is a mobile station.

* * * * *